United States Patent
Yamamoto et al.

(10) Patent No.: US 7,214,643 B2
(45) Date of Patent: May 8, 2007

(54) METAL OXIDE AND METHOD FOR PRODUCING THE SAME, AND CATALYST

(75) Inventors: Toshio Yamamoto, Nagoya (JP); Akihiko Suda, Seto (JP); Kae Yamamura, Nagoya (JP); Hideo Sobukawa, Nisshin (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 152 days.

(21) Appl. No.: 10/393,068

(22) Filed: Mar. 21, 2003

(65) Prior Publication Data

US 2003/0224931 A1 Dec. 4, 2003

(30) Foreign Application Priority Data

| | | | |
|---|---|---|---|
| Mar. 22, 2002 | (JP) | ............................. | 2002-080843 |
| Mar. 29, 2002 | (JP) | ............................. | 2002-094842 |
| Feb. 10, 2003 | (JP) | ............................. | 2003-032607 |
| Feb. 10, 2003 | (JP) | ............................. | 2003-032611 |

(51) Int. Cl.
*B01J 23/00* (2006.01)
*C04B 35/48* (2006.01)
*C01B 13/14* (2006.01)
*C01G 25/02* (2006.01)

(52) U.S. Cl. ..................... 502/300; 502/304; 502/349; 502/527.14; 502/527.24; 501/103; 423/592.1; 423/594.2; 423/608

(58) Field of Classification Search ................ 501/103; 502/300, 304, 349, 527.14, 527.24; 423/608, 423/592.1, 594.12, 594.2
See application file for complete search history.

(56) References Cited

U.S. PATENT DOCUMENTS

| | | | | |
|---|---|---|---|---|
| 5,908,800 A | * | 6/1999 | Bonneau et al. ............ | 501/103 |
| 5,958,827 A | * | 9/1999 | Suda et al. ................. | 502/304 |
| 6,133,194 A | * | 10/2000 | Cuif et al. .................. | 502/162 |

(Continued)

FOREIGN PATENT DOCUMENTS

JP 4-055315 2/1992

(Continued)

OTHER PUBLICATIONS

Y. Nagai, et al. Catalysis Today, vol. 74, pp. 225-234, "X-ray Absorption Fine Stucture Analysis of Local Structure of $CeO_2\_ZrO_2$ Mixed Oxides With the Same Composition Ratio (Ce/Zr=1)", 2002, no month.

*Primary Examiner*—David Sample
*Assistant Examiner*—Patricia L. Hailey
(74) *Attorney, Agent, or Firm*—Oblon, Spivak, McClelland, Maier & Neustadt, P.C.

(57) ABSTRACT

A metal oxide which has a large pore volume, and is very useful as a catalyst support. An alkaline material is added to an aqueous solution in which a compound of a metal element for composing an oxide is dissolved, a resultant mixture is co-precipitated, an obtained precipitate is washed, a washed precipitate is stirred in water along with a surfactant, and is calcined. By adding the surfactant after washing, the pH is not changed so that the adding effect of the surfactant is achieved to its upper most limit, thereby obtaining a metal oxide which has a large pore volume and a large mean diameter of secondary particles, and exhibits excellent gas diffusion properties.

21 Claims, 4 Drawing Sheets

U.S. PATENT DOCUMENTS

| | | | |
|---|---|---|---|
| 6,511,642 B1 * | 1/2003 | Hatanaka et al. | 423/239.1 |
| 6,680,040 B1 * | 1/2004 | Nishida et al. | 423/335 |
| 2003/0186805 A1 * | 10/2003 | Vanderspurt et al. | 502/304 |

FOREIGN PATENT DOCUMENTS

| | | |
|---|---|---|
| JP | 8-109020 | 4/1996 |
| JP | 8-215569 | 8/1996 |
| JP | 9-221304 | 8/1997 |
| JP | 10-512191 | 11/1998 |
| JP | 2001-524918 | 12/2001 |

* cited by examiner

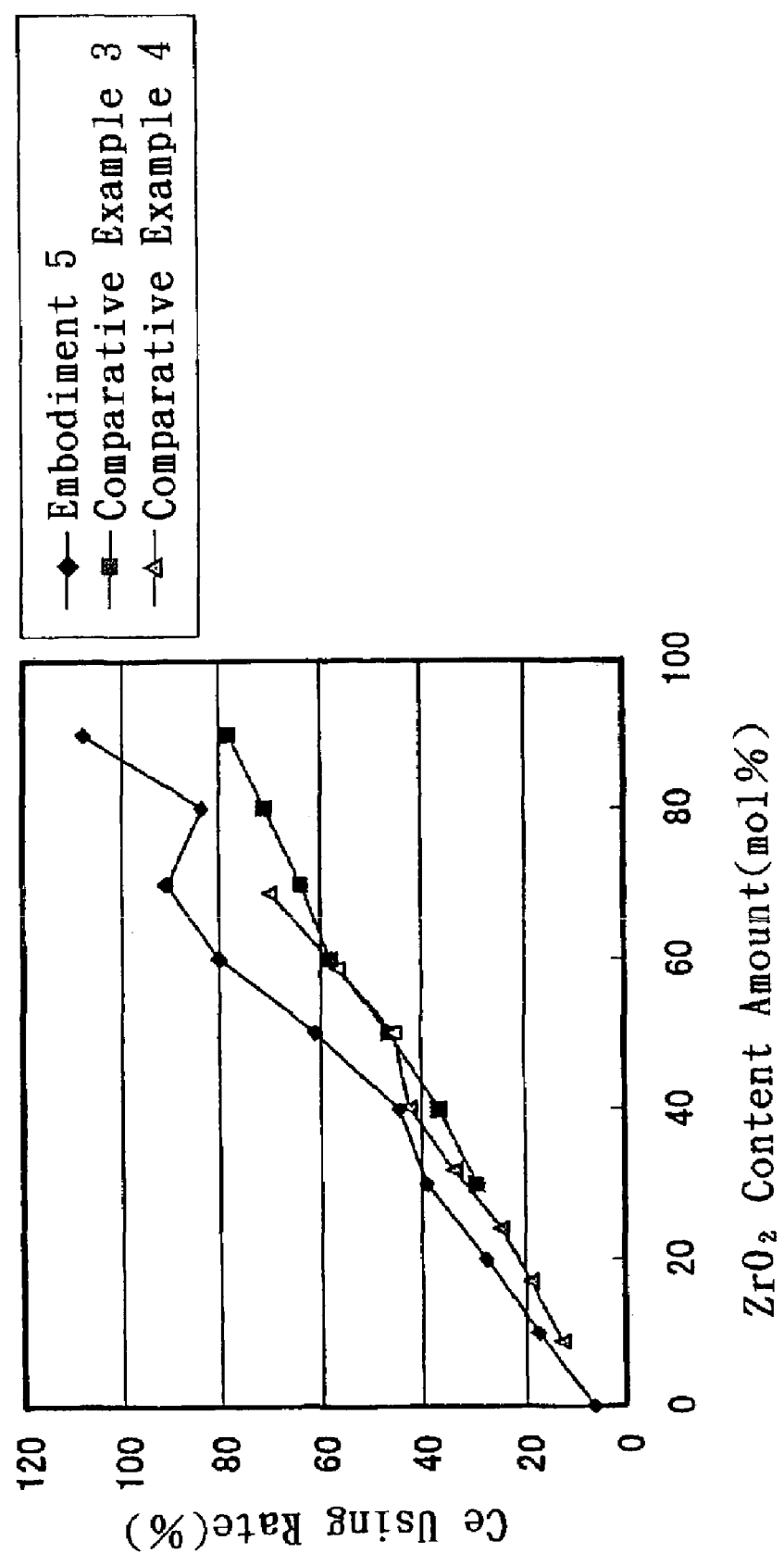

METAL OXIDE AND METHOD FOR PRODUCING THE SAME, AND CATALYST

BACKGROUND OF THE INVENTION

1. Field of the Invention

The present invention relates to a metal oxide for use as a catalyst support of a catalyst for purifying exhaust gases discharged from motor vehicles, and a catalyst using such metal oxide. The metal oxide in accordance with the present invention may be used as a catalyst support of a catalyst for oxidizing diesel particulates, a solid electrolyte, an electrode material, ceramics-dispersion reinforced particles, an ultra-violet ray-shielding material or the like.

2. Description of Related Art

The catalyst for purifying exhaust gases (three-way catalyst) is composed of a substrate which is made of a heat-resistant ceramics such as cordierite, a catalyst-support layer which is formed on the substrate, and is made of an active alumina or the like, and a catalyst metal such as Pt, which is supported by the catalyst-supporting layer. This three-way catalyst oxidizes hydrocarbon (HC) and carbon monoxide (CO) which are contained in exhaust gases from internal combustion engines, and reduces nitrogen oxides ($NO_x$) which are contained in the exhaust gases, thereby purifying exhaust gases.

The oxygen concentration in exhaust gases, however, greatly varies due to the operating condition of the internal combustion engines. Consequently, the purifying activity, that is oxidizing and reducing activity, of the three-way catalyst may become instable. To prevent this phenomenon, ceria (hereinafter referred to as $CeO_2$) has been added to the catalyst-supporting layer as a promoter. $CeO_2$ has an oxygen storage capacity (hereinafter referred to as OSC) of storing oxygen in an oxidization atmosphere, and releasing oxygen in a reduction atmosphere. By virtue of the OSC of $CeO_2$, a stable purifying activity which does not vary due to the variation of the oxygen concentration in exhaust gases can be obtained. In order to enhance the OSC, it is desired to enlarge the specific surface area of $CeO_2$. Accordingly, $CeO_2$ in a powder state has been used.

It has been reported that where the three-way catalyst which contains a catalyst metal and $CeO_2$, is used at elevated temperatures of 800° C. or more, the OSC thereof may decrease due to the crystal growth of $CeO_2$. To restrain the crystal growth of $CeO_2$ and maintain a high OSC, means of adding zirconia (hereinafter referred to as $ZrO_2$) or oxides of rare earth elements except for cerium has been developed. By adding $ZrO_2$ or the like to $CeO_2$, the heat resistance of $CeO_2$ is improved, thereby improving the OSC thereof after endurance tests at elevated temperatures.

Japanese Unexamined Patent Publication (KOKAI) No. 04-055315, for example, discloses the method for producing fine powders of cerium oxide, which includes the steps of co-precipitating a $CeO_2$ precursor and a $ZrO_2$ precursor from a mixture aqueous solution of a water-soluble salt of cerium (Ce) and a water-soluble salt of zirconium (Zr), and subjecting the obtained co-precipitate to a heat treatment. With this method, $CeO_2$ and $ZrO_2$ become a composite oxide by the heat treatment of the obtained co-precipitate, thereby forming an oxide solid solution in which $CeO_2$ and $ZrO_2$ are dissolved in a solid phase.

Japanese Unexamined Patent Publication (KOKAI) No. 08-215569 discloses the technique of using a $CeO_2$—$ZrO_2$ composite oxide which is prepared from metal alkoxides. In the $CeO_2$—$ZrO_2$ composite oxide prepared from the metal alkoxides by the sol-gel method, Ce and Zr are made composite on an atomic level or molecular level, and become a solid-solution. Accordingly, the heat resistance is improved, and a high OSC is ensured from a beginning of use of $CeO_2$—$ZrO_2$ composite oxide to the end of an endurance test.

Published Japanese Translation Publication (KOHYO) No. 10-512191 discloses a $CeO_2$—$ZrO_2$ solid solution which is prepared by making the pH of a mixture aqueous solution of a water-soluble inorganic cerium salt and a water-soluble inorganic zirconium salt alkaline, thereby co-precipitating precursors thereof, and calcining the co-precipitated precursors. The $CeO_2$—$ZrO_2$ solid solution produced by this co-precipitation method exhibits a high specific surface area even after calcining at temperatures as high as 1000° C., and accordingly, is most suited to the catalyst support.

However, recently, the temperature of the exhaust gases from motor vehicles tends to increase, and accordingly, even the catalyst using the above-described conventional $CeO_2$—$ZrO_2$ solid solution has the problem that the heat resistance is insufficient, though OSC is high. It becomes clear that this problem is caused by the decrease of the specific surface area due to the occurrence of sintering in the $CeO_2$—$ZrO_2$ solid solution.

In addition, in the case of the conventional $CeO_2$—$ZrO_2$ solid solution, $ZrO_2$ is not highly dissolved in a solid phase, OSC thereof is merely about 150 μmol-$O_2$/g. The performance is inferior. Even where $ZrO_2$ is highly dissolved in a solid phase, a high OSC is not always achieved thereby. Japanese Unexamined Patent Publication (KOKAI) No. 09-221304, for example, discloses a $CeO_2$—$ZrO_2$ solid solution with a high solid-solubility. In the $CeO_2$—$ZrO_2$ solid solution of this publication, however, the ratio of cerium ions which contribute to the achievement of the OSC is 53% where the atomic ratio of Ce/Zr is 5/5, and 69.5% where the atomic ratio of Ce/Zr is 3/7. The using efficiency of cerium ions is not sufficient. Accordingly, it is desired to further improve the OSC by further increasing the using efficiency of cerium ions.

On the other hand, Japanese Unexamined Patent Publication (KOKAI) No. 08-109020 discloses a composite oxide containing cerium oxide, zirconium oxide and hafnium oxide, and having a φ' phase. The φ' phase indicates a $CeO_2$—$ZrO_2$ solid solution in which cerium ions and zirconium ions are regularly arranged.

It is known that the $CeO_2$—$ZrO_2$ solid solution which has a regular arrangement of cerium ions and zirconium ions, that is correctly a $CeO_2$—$ZrO_2$ composite oxide, can exhibit OSC which is as high as about 800 μmol-$O_2$/g even when the ambient temperature increases up to 1000° C. However, in order to form a regular arrangement in the composite oxide disclosed in the above-described publication, a reduction treatment at elevated temperatures is needed, and accordingly, the composite oxide disclosed in the above-described publication exhibits the problem that the specific surface area decreases to about 5 m²/g due to sintering.

Japanese Unexamined Patent Publication (KOKAI) No. 09-221304 also discloses a method for producing a $CeO_2$—$ZrO_2$ solid solution, wherein a surfactant is added upon precipitating oxide precursors from an aqueous solution in which metal salts of Ce and Zr are dissolved, to decrease the diameter of crystallites, thereby increasing the solid-solubility and enhancing the exhibited OSC. And, Published Japanese Translation Publication (KOHYO) No. 2001-524918 also discloses a method for producing $ZrO_2$ or a $CeO_2$—$ZrO_2$ solid solution, wherein a surfactant is added upon precipitating oxide precursors from the aqueous solution in which metal salts are dissolved, to suitably adjust the particle size distribution, the pore volume, or the like.

With the addition of the surfactant upon precipitating the oxide precursors, as disclosed above, plural kinds of precipitated particles are captured in micelles of the surfactant homogeneously. And neutralization, coagulation and maturation proceed in the micelles, and consequently, the formation of particles of the solid solution proceeds in narrow spaces in which plural components are included homogeneously and concentrated. In addition, with the dispersion effect of the surfactant, the dispersion properties of the precipitated particulates are improved, and the segregation thereof is reduced to enhance the contacting degree thereof. Consequently, the precipitated particulates become highly dissolved, and the mean diameter of the crystallites can be decreased.

The method by which a surfactant is added upon precipitating the oxide precursors from an aqueous solution of metal salts, however, has the problem that as the diameter of secondary particles of the obtained oxide powder decreases, the pore volume may be also decreased, and consequently, where used as a catalyst support, the properties of the obtained oxide powder may not be achieved sufficiently.

For example, the catalyst for purifying exhaust gases, which has a honeycomb substrate and a coat layer composed of a catalyst support powder, and supports catalyst components such as noble metals in the coat layer, has the problem that the catalyst components in a lower part of the coat layer cannot be used effectively. This is considered to be caused by the pore volume being small.

SUMMARY OF THE INVENTION

The present invention has been contemplated in consideration of the above-described circumstances, and has an object of providing a metal oxide which has a large pore volume and which is very useful as a catalyst support.

The present invention has another object of providing a $CeO_2$—$ZrO_2$ solid solution in which $ZrO_2$ is dissolved in a solid phase homogeneously with solid solubility of 98% or more, and which exhibits a high OSC and heat resistance.

Other objects, features, and characteristics of the present invention will become apparent upon consideration of the following description and the appended claims with reference to the accompanying drawings, all of which form a part of this specification.

BRIEF DESCRIPTION OF THE DRAWING

FIG. 8 is a graph showing the relation between the $ZrO_2$ content and the Ce using rate in the $CeO_2$—$ZrO_2$ solid solutions.

Figure 1:
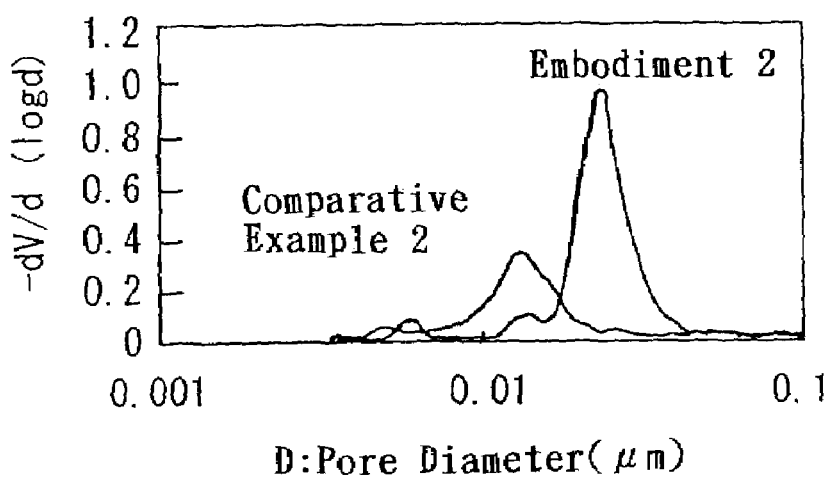
FIG. 1 is a graph showing the pore size distribution of $ZrO_2$ powders of Embodiment 2 and Comparative example 2.

The metal oxide in accordance with the present invention, which can achieve the above-described objects, is characterized in that the volume of pores, each having a diameter of 0.1 μm or less, is 0.2 cc/g or more. It is preferable that the volume of pores, each having a diameter of 0.1 μm or less, is 0.3 cc/g or more.

In addition, it is preferable that the volume of pores, each having a diameter of 0.01 μm or more and 0.1 μm or less, is 0.2 cc/g or more. Furthermore, it is preferable that the volume of pores, each having a diameter of 0.01 μm or more and 0.05 μm or less, is 0.1 cc/g or more, which is 70% or more of the volume of pores, each having a diameter of 0.01 μm or more and 0.1 μm or less.

The method for producing the above-described metal oxide in accordance with the present invention is characterized by the successive conduction of a first step of adding an alkaline material to an aqueous solution in which compounds of metal elements for forming an objective metal oxide are dissolved, thereby obtaining a precipitate of an oxide precursor, a second step of washing the obtained precipitate, a third step of stirring the washed precipitate in water along with a surfactant, and a fourth step of calcining the precipitate obtained in the third step.

It is preferable that, in the fourth step, at least one part of an organic substance remains as liquid after at least one part of the precipitate decomposes.

It is preferable that in the method of the present invention, the surfactant is added by the amount of 2 to 40 weight % of an objective metal oxide powder. In addition, it is preferable that the metal element is Zr, or Ce with Zr, and that the metal oxide of the present invention is $ZrO_2$ or a $CeO_2$—$ZrO_2$ solid solution.

Where the metal oxide of the present invention is the $CeO_2$—$ZrO_2$ solid solution, it has a cubic system fluorite structure, and does not have a specific regular arrangement of cations, such as a pyrochlore phase. 75% or more of Ce ions can become trivalent in a reduction atmosphere of 500° C. It is preferable that 90% or more of Ce ions can become trivalent in a reduction atmosphere of 500° C.

Where the metal oxide of the present invention is the $CeO_2$—$ZrO_2$ solid solution, it can have the structure in which $ZrO_2$ is dissolved in a solid phase homogeneously with solid-solubility of 98% or more. And it can have the properties that the specific surface area thereof is 80 m²/g or more after calcining at 600° C. for 5 hours, the specific surface area thereof is 40 m²/g or more after calcining at 800° C. for 5 hours, and the specific surface area thereof is 20 m²/g or more after calcining at 1000° C. for 5 hours.

In addition, where the metal oxide of the present invention is the $CeO_2$—$ZrO_2$ solid solution, the unique advantage that, when the atomic ratio of Ce/Zr ranges from 45/55 to 40/60, the amount of storage oxygen shows a peak, is achieved.

And, it is preferable that where the metal oxide of the present invention is the $CeO_2$—$ZrO_2$ solid solution, the ratio of cerium ions which contribute to the improvement of the oxygen storage capacity, to the entire cerium ions included in the metal oxide is 60% or more, and more preferably, 75% or more, and much more preferably, 90% or more.

In the $CeO_2$—$ZrO_2$ solid solution in which the ratio of cerium ions contributing to improve the oxygen storage capacity is 60% or more, it is preferable that the saturated storage oxygen at 50° C. is 450 µmol-$O_2$/g or more, and more preferably, 500 µmol-$O_2$/g or more.

Where the metal oxide of the present invention is the $CeO_2$—$ZrO_2$ solid solution, even the $CeO_2$—$ZrO_2$ solid solution in which the ratio of cerium ions contributing to improve the oxygen storage capacity is 60% or more, can have the properties that the specific surface area thereof is 80 $m^2$/g or more after calcining at 600° C. for 5 hours, the specific surface area thereof is 40 $m^2$/g or more after calcining at 800° C. for 5 hours, and the specific surface area thereof is 20 $m^2$/g or more after calcining at 1000° C. for 5 hours. And where the atomic ratio of Ce/Zr is 1/9, the $CeO_2$—$ZrO_2$ solid solution does not transform to a tetragonal system or monoclinic system, but can maintain substantially a cubic system fluorite structure.

And the catalyst of the present invention is characterized in that the metal oxide of the present invention supports at least one kind of noble metal.

DETAILED DESCRIPTION OF THE PRESENTLY PREFERRED EMBODIMENTS

In the conventional metal oxides such as $Al_2O_3$, $ZrO_2$, and $CeO_2$—$ZrO_2$ solid solution, which have been used as catalyst supports of catalyst for purifying exhaust gases, the volume of pores, each having a diameter of 0.1 µm or less, ranges in a comparatively small range, that is less than 0.2 cc/g. Consequently, the gas-diffusion properties in a coat layer are low, and accordingly, it has been difficult to effectively use catalyst components supported in a lower part of the coat layer. The volume of pores means the total volume of respective pores. In addition, secondary particles are resulted from coagulation of primary particles. The mean diameter of the secondary particles corresponds to the actual mean diameter of particles of the metal oxide powder.

In the metal oxide in accordance with the present invention, the volume of pores, each having a diameter of 0.1 µm or less, is 0.2 cc/g or more. By forming a coat layer of a powder of this metal oxide, the formed coat layer exhibits excellent gas diffusion properties, and even in a lower part of the coat layer, catalyst components contact exhaust gases sufficiently so that the catalyst components can be effectively used, thereby improving the purification ability.

Where, in the powder of the metal oxide in accordance with the present invention, if the volume of pores, each having a diameter of 0.1 µm or less, is less than 0.2 cc/g, sufficient gas diffusion properties cannot be obtained. And if the mean diameter of the secondary particles is too great, the powder becomes fragile so that a resultant coat layer may be peeled during using. Accordingly, it is preferable that the mean diameter of the secondary particles is 30 µm or less.

The metal oxide in accordance with the present invention can be composed of a composite oxide of $Al_2O_3$, $ZrO_2$, $TiO_2$, $SiO_2$, $CeO_2$, or a plurality of oxides which are arbitrarily selected from these oxides. $ZrO_2$ or a $CeO_2$—$ZrO_2$ solid solution, for example, is especially preferable. Where the catalyst which supports Rh, for example, is composed of $ZrO_2$, the steam-reforming reaction activity thereof is greatly improved due to high gas diffusion properties, and accordingly, it can be used as a hydrogen forming catalyst having a high forming ability. In the case of the $CeO_2$—$ZrO_2$ solid solution, the gas diffusion properties are high so that a high OSC is effected, whereby it can compose a useful three-way catalyst.

In the method in accordance with the present invention, which is capable of surely and readily producing a powder of the metal oxide in accordance with the present invention, in the first step, an alkaline material is added to an aqueous solution in which a compound containing a metal element for forming an oxide is dissolved, thereby forming a precipitate of an oxide precursor.

The aqueous solution in which the compound containing the metal element for forming the oxide is dissolved can be composed of an aqueous solution of a water-soluble compound which contains metals such as Al, Zr, Ti, Si, Ce or the like, and where the metal is Ce or Zr, for example, an aqueous solution of cerium (III) nitrate, ammonium cerium (IV) nitrate, cerium (III) chloride, cerium (III) sulfate, cerium (IV) sulfate, zirconium oxynitrate, zirconium oxychloride or the like can be used.

The alkaline material can be composed of any material which exhibits alkalinity as an aqueous solution thereof. It is especially desirable to use ammonia which can be readily separated during a heating step. However, other alkaline materials such as hydroxide of alkaline metal can be used, because these alkaline materials can be readily removed by washing them with water. It is preferable to add the alkaline material as an aqueous solution thereof. The aqueous solution of the alkaline material may be dropped gradually, or the entire amount thereof can be mixed at the same time. In order to prevent the segregation of the precipitate, it is preferable to add the alkaline material while stirring the aqueous solution in which the metal elements are dissolved.

Where the $CeO_2$—$ZrO_2$ solid solution is produced, the valence of cerium must be carefully selected. When cerium is tetravalent, there occurs no problem, because $CeO_2$ is dissolved with $ZrO_2$ in a solid phase with comparative ease. However, when cerium is trivalent, it is preferable to coexist hydrogen peroxide in the aqueous solution, for example, because $CeO_2$ is difficult to be dissolved with $ZrO_2$ in a solid phase. By virtue of the coexistence of the above-described materials, cerium (III) forms a complex with hydrogen peroxide, and the formed complex is oxidized to form cerium (IV). Accordingly, $CeO_2$ can be readily dissolved with $ZrO_2$ in a solid phase.

It is preferable that the amount of hydrogen peroxide is ¼ or more of the amount of cerium ions. When the amount of hydrogen peroxide is less than ¼ of the amount of cerium ions, the solid solution of $CeO_2$ and $ZrO_2$ becomes insufficient. Even where hydrogen peroxide is added excessively, no seriously bad influence is exerted. But it is economically disadvantage to exhibit no merit, and accordingly, the preferred amount of hydrogen peroxide ranges from one half of the amount of cerium ions to double the same. The adding time of hydrogen peroxide is not limited specifically. It may be before or after adding the alkaline material, or simultaneously therewith. In addition, hydrogen peroxide is an especially preferable oxidizing agent, because it does not require any post-treatment. In some cases, other oxidizing agents such as oxygen gas, ozone, perchloric acids, permanganic acids or the like can be used.

Furthermore, it is also preferable to add alkaline materials while stirring an aqueous solution in which compounds of metal elements for forming an objective oxide are dissolved, at a high stirring speed; that is with a high shearing rate of $10^3$ $sec^{-1}$ or more, more preferably $10^4$ $sec^{-1}$ or more. Some segregation may occur in components of the precipitated particulates which are formed due to neutralization. By virtue of the high-speed stirring, the segregation can be prevented and a homogeneous state can be effected with improved diffusion properties. Where a cerium salt and a zirconium salt are co-precipitated from an aqueous solution thereof, for example, the pH values for precipitating these salts differ from each other, and accordingly, precipitated particulates of the same kind may form a group. By virtue of the high-speed stirring with a high shearing rate, the group of the precipitated particulates of the same kind is broken to improve the contacting degree of a precursor of $CeO_2$ and a precursor of $ZrO_2$, whereby the precipitated particulates are mixed thoroughly. Consequently, the solid-solubility of $CeO_2$—$ZrO_2$ solid solution can be improved, and the mean diameter of crystallites can be reduced. When the shearing speed is less than $10^3$ sec$^{-1}$, a sufficient effect of promoting the solid solution cannot be achieved. The shearing rate V is expressed by the following equation: $V=v/D$, wherein v represents a difference in speed between a rotor and a stator of a stirrer, and D represents a distance (m) between the rotor and the stator.

With the conventional co-precipitation method, compounds of metal elements for forming an objective oxide, an alkaline material and a surfactant coexist in an aqueous solution thereof. This results in that the properties of a surfactant material change due the variation of the pH caused by the addition of the alkaline material, whereby the advantage caused by the addition of the surfactant is lost.

Accordingly, with the producing method of the present invention, in the second step, the precipitate of the precursor of oxide is washed, and in the third step, the washed precipitate is stirred along with the surfactant in water. By washing in the second step, the alkaline material, free acids and the like are washed away from the precursor of oxide. Accordingly, in the third step, the pH is not changed so that the achieved effect which is resulted from the addition of the surfactant becomes maximum, And by calcining in the fourth step, the metal oxide in which the volume of pores, each having a diameter of 0.1 μm or less, is 0.2 cc/g or more can be produced.

The operation of the surfactant has not been clarified, but can be estimated, as follows: Namely, when the neutralization with the alkaline material is just completed, the metal elements for forming an oxide precipitate as hydroxide particulates or oxide particulates, each having a very small particle diameter of several nm or less. And during washing in the second step, or the like, the coagulation of primary particles proceeds to form secondary particles.

By virtue of the addition of the surfactant in the third step, the secondary particles are captured in micelles of the surfactant, and coagulation and maturation thereof proceed in the micelles, whereby particles gradually grow in concentrated small spaces. In addition, the diffusion properties of the secondary particles are improved with the diffusion effect of the surfactant. With these operations, a metal oxide powder in which the volume of pores, each having a diameter of 0.1 μm or less, is 0.2 cc/g or more can be produced.

It is preferable that the amount of the surfactant to be added in the third step ranges from 2 to 40 weight % of the amount of the objective metal oxide powder. Namely, the preferred weight ratio of the metal oxide powder to the surfactant ranges from 98~60 to 2~40. Where the amount of the surfactant is less than 2 weight %, the effect resulted from the addition of the surfactant is low, whereas, when the amount thereof exceeds 40 weight %, the surfactant coagulates to decrease the diffusion properties of the precursor of oxide, and since in the fourth step, the calorific value due to the burning of the surfactant increases upon calcining, thereby generating coagulation of the metal oxide, and decreasing the specific surface area thereof.

It is preferable that the amount of water used in the third step is about identical to the amount of water used in the first step, but the amount of water used in the third step is not limited specifically, provided that stirring thereof can be carried out. And it is preferable that the stirring speed In the third step is 1000 sec$^{-1}$ or more, and it is preferable to stir at 10 to 30° C. for 5 minutes or more. If the shearing force caused by stirring is too great, heat is generated, and the device wears remarkably. If the shearing force is too small, the diffusion state of surfactant may become insufficient. In addition, when the temperature upon stirring is lower than this range, a longer stirring time is required, while when the temperature upon stirring is higher than this range, heat is generated and the device is worn.

The surfactant may be composed of any one of an anionic surfactant, a cationic surfactant, a nonionic surfactant, or the like. Especially, it is preferable to use the surfactant which enables the formed micelles to define narrow spaces, such as the surfactant which facilitates the formation of spherical micelles. In addition, it is preferable to use the surfactant in which the critical micelle concentration (cmc) is 0.1 mol/liter or less, and more preferably 0.01 mol/liter or less. The critical micelle concentration (cmc) means the minimum concentration when the surfactant forms micelles.

Examples of these surfactants include anionic surfactants such as alkylbenzene sulfonic acids and salts thereof, α olefin sulfonic acids and salts thereof, alkylsulfuric ester salts, alkylether sulfuric ester salts, phenylether sulfuric ester salts, methyl taurinic acids salts, sulfosuccinic acid salts, ether sulfonate salts, alkyl sulfuric acid salts, ether sulfonate salts, saturated fatty acids and salts thereof, unsaturated fatty acids such as oleic acids, and salts thereof, other carbonxylic acids, sulfonic acids, sulfuric acids, phosphoric acids, derivatives of phenol or the like;

nonionic surfactants such as polyoxyethylene polypropylene alkyl ether, polyoxyethylene alkyl ether, polyxyethylene alkyl phenyl ether, polyoxyethylene polystyryle phenyl ether, polyoxyethylene polyoxypolypropylene alkyl ether, polyoxyethylene polyoxypropylene glycol, polyhydric alcohols including glycol, glycerin, sorbitol, mannitol, pentaerythritoll, sucrose, or the like, fatty acid partial ester of polyhydric alcohol, polyoxyethylene fatty acid partial ester of polyhydric alcohol, polyoxyethylene fatty acid ester of polyhydric alcohol, polyoxyethylene castor oil, polyglycerin fatty acid ester, fatty acid diethanolamide, polyoxyethylene alkyl amine, triethanol amine fatty acid partial ester, trialkyl amine oxide or the like;

cationic surfactants such as fatty acid primary amine salts, fatty acid secondary amine salts, fatty acid tertiary amine salts, quarternary ammonium salts including tetra-alkyl ammonium salts, trialkyl benzyl ammonium salts, alkyl pirozinium salts, 2-alkyl-1-alkyl-1-hydroxyethyl imidazolium salts, N,N-dialkyl molhorinium salts, polyethylene polyamine, fatty acid amide salts or the like; and amphoteric surfactants such as betaine compounds or the like. At least one kind of these surfactants can be used.

In the fourth step, the precipitate of an oxide precursor, which is obtained in the third step, is calcined to oxidize the metal elements included in the precipitate. The calcining atmosphere may be an oxidization atmosphere, reduction atmosphere, or neutral atmosphere. Oxygen contained in water or the like of the aqueous solution which is used as a raw material operates in the calcining step to oxidize the metal elements contained in the precipitate, whereby the metal elements in the precipitate is oxidized while calcining. Accordingly, by calcining even in a reduction atmosphere, metal oxides can be obtained. It is preferable that the calcining temperature ranges from 150 to 800° C. When the calcining temperature is lower than 150° C., a long calcining time is needed, and when the calcining temperature exceeds 800° C., the specific surface area decreases.

In addition, the washing step of precipitate can be further carried out between the third step and the fourth step. By washing the precipitate after the third step and before the fourth step, the surfactant can be removed, thereby preventing heat generation due to burning of the surfactant upon calcining in the fourth step.

With another producing method in accordance of the present invention, a $CeO_2$—$ZrO_2$ solid solution in which the volume of pores, each having a diameter of 0.1 μm or less, is 0.2 cc/g or more, and Ce ions and Zr ions are distributed homogeneously to exhibit a high OSC, can be produced.

This method is characterized by the steps including:

a mixing step of forming a solution which contains a cerium compound and a zirconium compound which are to decompose by heating, along with an organic substance, and in which the cerium compound and zirconium compound are dissolved at least in the heating step, and preparing a mixture in which at least one part of the organic substance are in a liquid phase after at least one part of the cerium compound and zirconium compound is dissolved, a decomposing step of stirring the obtained mixture with a surfactant added, and heating the mixture, thereby decomposing the mixture to form a homogeneous precursor, and a calcining step of calcining the precursor to burn and remove the organic substance, thereby forming a $CeO_2$—$ZrO_2$ solid solution.

With this method, in the mixing step, the solution which contains a cerium compound and zirconium compound which are to decompose by heating, along with an organic substance, and in which the cerium compound and the zirconium compound are dissolved at least in the heating step, is formed, and a mixture in which at least one part of the organic substance is in a liquid phase after at least one part of the cerium compound and zirconium compound decomposes, is prepared. The mixing ratio of a cerium element and a zirconium element is not limited specifically, but it is preferable that if a resultant metal oxide is used as a catalyst for purifying exhaust gases, the atomic ratio of Ce to Zr ranges from 9/1 to 1/9, more preferably, from 6/4 to 2/8, further preferably, from 5/5 to 3/7.

It is preferable that in the mixing step, at lease one part of the organic substance is in a liquid phase after at least one part of the mixture decomposes. As at lease one part of the organic substance is in a liquid phase after at least one part of the cerium compound and the zirconium compound decomposes, cerium ions and zirconium ions are continuously mixed homogeneously on an atomic level in the liquid organic substance. This state can be maintained stably. Consequently, the cerium ions and the zirconium ions can be mixed homogeneously.

In the following decomposing step, the surfactant is added to the mixture obtained in the mixing step, then stirred together, and is heated, whereby the mixture decomposes and a homogeneous precursor is obtained. By virtue of this step, the surfactant can effect the operation similar to the above-described operation, whereby a $CeO_2$—$ZrO_2$ solid solution in which the volume of pores, each having a diameter of 0.1 μm or less, is 0.2 cc/g or more, can be produced.

By further heating in the calcining step, the organic substance is burnt and removed, and a $CeO_2$—$ZrO_2$ solid solution in which $ZrO_2$ is dissolved homogeneously in a solid phase is produced.

One of the cerium compound and zirconium compound may be used as a source of the organic substance, and the above-described surfactant can have the function as the organic substance. In addition, an organic compound other than the surfactant may be previously mixed in the aqueous solution. Examples of the preferred organic compound include water-soluble organic compounds such as monohydric alcohols, polyhydric alcohols, monomers, dimers, trimers or polymers of polyhydric alcohols, water-soluble high molecular compounds, monosaccharides, disaccharides, polysaccharides, carbohydrates, carboxylic acids and salts thereof. But, the organic compounds may not be limited to water-soluble organic compounds, provided that the above-described conditions are satisfied.

Examples of the monohydric alcohols include 1-pentanol, 1-hexanol, 1-heptanol, 1-octanol, 2-octanol, monoethanol amine, diethylene glycolmonoethyl ether, other alkyl alcohols, and aminoalkyl alcohols, of which the number of carbon is 10 or less, along with isomers and derivatives thereof.

Examples of the monomers of the polyhydric alcohols include diethanol amine, triethanol amine, ethylene glycol, propylene glycol, glycerin, 1,5-pentanediol, other polyhydric alcohols of which the number of carbon is 10 or less. Examples of the dimers of polyhydric alcohols include diethylene glycol, ethylene propylene glycol, derivatives of diethylen glycol and ethylene propylene glycol, and other dimers obtained by condensation of dihydric alcohols. Examples of the trimers of the polyhydric alcohols include triethylene glycol, tripropylene glycol, derivatives of triethylene glycol and tripropylene glycol, and other dimers obtained by condensation of dihydric alcohols.

Examples of the water-soluble high molecular compounds include polyethylene glycol, polyacrylic acids and derivatives thereof, polyvinyl alcohols and derivatives thereof, cellulose and derivatives thereof, or the like.

Examples of the monosaccharides, disaccharides, polysaccharides and carbohydrate include sorbitol, dextrin, starch, glycogen, pentose, glucose, fructose, galactose, maltose, saccharose, lactose, monnose, or the like. Examples of the carbonic acids or the salts thereof include citric acids, succinic acids, tartaric acids, malic acids, malonic acids, mannonic acids and salts thereof.

The preferred mixing amount of the organic substance ranges from 10 to 1000 parts by weight relative to 100 parts by weight of a final $CeO_2$—$ZrO_2$ solid solution. The more preferred mixing amount ranges from 50 to 300 parts by weight. When the amount of the organic substance is less than this range, it becomes difficult to obtain a $CeO_2$—$ZrO_2$ solid solution in which $CeO_2$ and $ZrO_2$ are homogeneously dissolved in a solid phase, and when the amount of the organic substance exceeds this range, the calcining time becomes long, and a great amount of energy is needed so as to be less preferable.

However, in this calcining step, the specific surface area may decrease due to heat generated when the coexisting organic substance is burnt and removed. Accordingly, it is preferable to decrease the rising rate of the temperature to less than 50° C./hr, or to adjust the rising rate of the temperature such that the temperature of the precursor does not exceed the final calcining temperature.

By the above-described method, a $CeO_2$—$ZrO_2$ solid solution in which cerium ions and zirconium ions are dispersed homogeneously on an atomic level can be obtained. The obtained $CeO_2$—$ZrO_2$ solid solution has a cubic system fluorite structure, and does not have a specific regular arrangement of cations such as a pyrochlore phase.

75% or more of Ce ions can become trivalent in a reduction atmosphere of 500° C. It is preferable that 90% or more of Ce ions can become trivalent in a reduction atmosphere of 500° C.

The $CeO_2$—$ZrO_2$ solid solution which is obtained with the above-described method can have the structure in which $ZrO_2$ is dissolved in a solid phase homogeneously with solid-solubility of 98% or more. And since it has uniform mesopores to exhibit an improved heat resistance, it can have the properties that the specific surface area thereof is 80 $m^2/g$ or more after calcining at 600° C. for 5 hours, 40 $m^2/g$ or more after calcining at 800° C. for 5 hours, and 20 $m^2/g$ or more after calcining at 1000° C. for 5 hours.

The solid-solubility is obtained from a peak shift of an X-ray diffraction and is defined by the following equation:

Solid-solubility(%)=100×(amount of $ZrO_2$ dissolved in $CeO_2$ in a solid phase)/total amount of $ZrO_2$ The solid-solubility S (%) is calculated using the equation (1):

$$S=100\times(x/C)\times[(100-C)/(100-x)] \quad (1)$$

wherein C represents the content (%) of $ZrO_2$, which is obtained from the composition ratio of Ce and Zr, and x represents the concentration (%) of $ZrO_2$ dissolved in $CeO_2$ in a solid phase, which is calculated from the lattice constant obtained from the X-ray diffraction, using the equation (2).

$$x=(5.423-a)/0.003 \quad (2)$$

wherein a in the equation (2) represents the lattice constant (Å).

In order to explain the mechanism that a high OSC which is similar to the theoretical OSC value (OSC obtained when the entire cerium ions included in the system reversibly changes from trivalence to quatrevalence) is obtained in the $CeO_2$—$ZrO_2$ solid solution, first, the mechanism that the OSC of $CeO_2$ increases due to the solid solution of $ZrO_2$ in $CeO_2$ will be explained.

Zirconium ions replace cerium ions located in cation sites of the fluorite structure of $CeO_2$, and are dissolved in a solid phase. Since the ion radius of zirconium ions is smaller than that of quatrevalent cerium ions by about 20%, by virtue of the solid solution of $ZrO_2$ in $CeO_2$, the cerium ions are restrained from deforming due to the expansion of its volume, which would occur when cerium ions become trivalent. It is considered that this results in the OSC being improved. Accordingly, it is considered effective that in the $CeO_2$—$ZrO_2$ solid solution, cerium ions and zirconium ions exist as close as possible.

It has been known that the $CeO_2$—$ZrO_2$ solid solution has a fluorite crystal structure, similarly to $CeO_2$, and it has been clarified that when cerium ions and zirconium ions take a Φ (pyrochlore) phase and a Φ' phase in which these ions are arranged in the solid solution regularly, in a reduction state and oxidation state, respectively, a high OSC similar to the theoretical value thereof can be obtained. This is caused by the regular arrangement being most suitable for the existence of cerium ions and zirconium ions close to each other. It must be noted that the Φ (pyrochlore) phase and the Φ' phase are strictly not a fluorite structure but another crystal structure, and the $CeO_2$—$ZrO_2$ solid solution should be referred to as a composite oxide having a specific composition. But, in the present specification, they are referred to as the $CeO_2$—$ZrO_2$ solid solution, respectively.

On the other hand, in the $CeO_2$—$ZrO_2$ solid solution having a random arrangement wherein cerium ions and zirconium ions are not arranged regularly, even the $CeO_2$—$ZrO_2$ solid solution of which the solid-solubility is 100% does not have the OSC similar to the theoretical value thereof. The reason is considered, as follows: It can be considered that, by the conventional method, cerium ions and zirconium ions are not arranged completely randomly in the $CeO_2$—$ZrO_2$ solid solution, but clusters of cerium ions or clusters of zirconium ions exist within crystallites of the $CeO_2$—$ZrO_2$ solid solution. Therefore, it can be considered that zirconium ions do not achieve the operation of improving the OSC sufficiently.

It can be considered that with the $CeO_2$—$ZrO_2$ solid solution in accordance with the present invention, the distribution of cerium ions and zirconium ions is random so that the operation of improving the OSC is effectively achieved by zirconium ions, and the composition ratio of the cerium ions adapted to be used to exhibit the oxygen storage ability increases so that a high OSC close to the theoretical value thereof is obtained.

Figure 7:
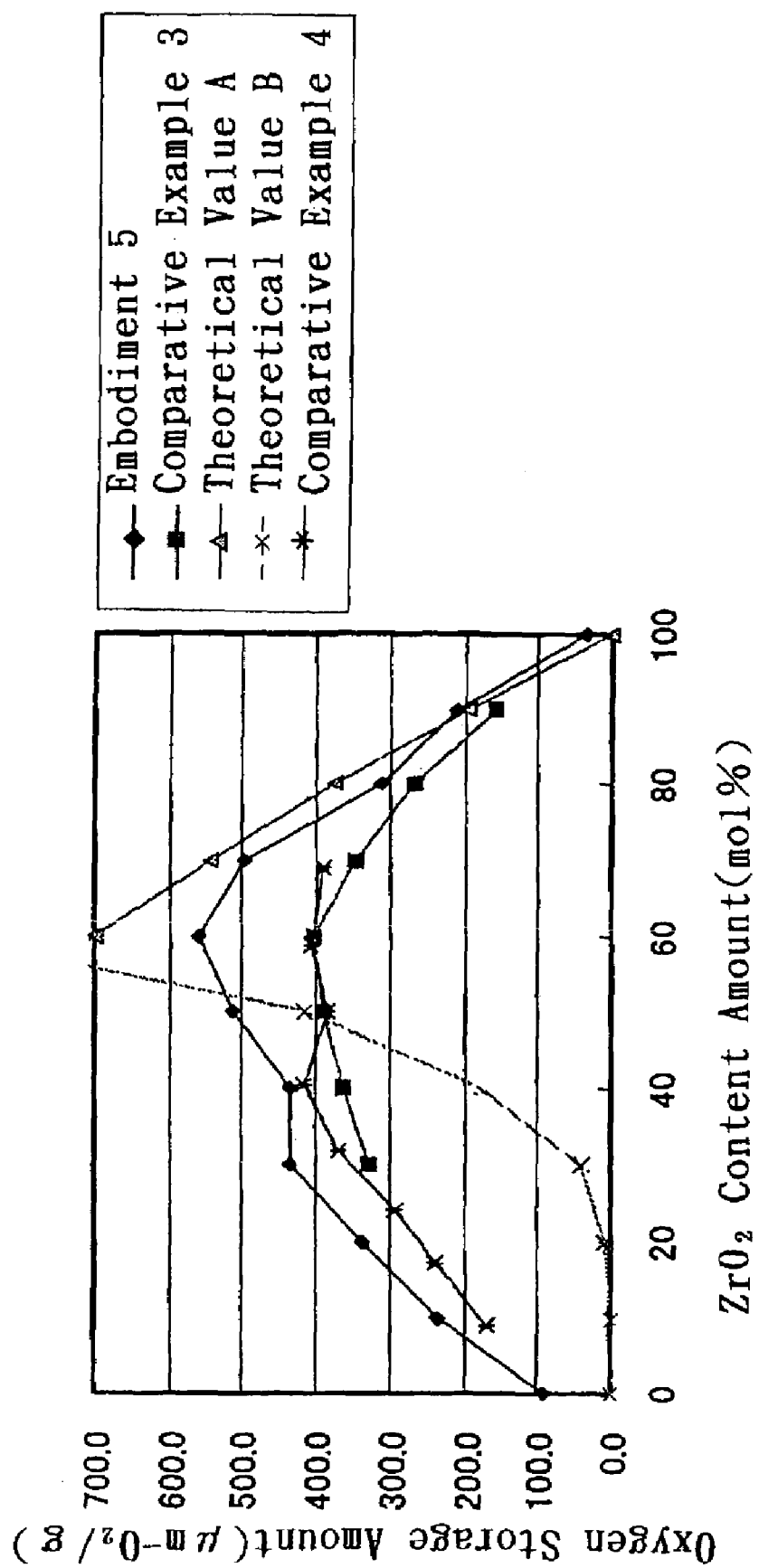
FIG. 7 is a graph showing the relation between the $ZrO_2$ content and the oxygen storage amount in the $CeO_2$—$ZrO_2$ solid solutions.

It has been understood that where oxygen is released from a composite oxide of $CeO_2$—$ZrO_2$ solid solution, which has a Φ' phase, in a reduction atmosphere, oxygen of which coordinated four cations are all zirconium ions is released. The fluorite structure of the $CeO_2$—$ZrO_2$ solid solution is similar to the structure of the $CeO_2$—$ZrO_2$ solid solution which has a Φ' phase. Accordingly, we will argue using this oxygen releasing theory.

Where cerium ions and zirconium ions are distributed completely randomly, the amount of oxygen of which coordinated four cations are all zirconium ions, relative to the $CeO_2$—$ZrO_2$ composition, can be shown as a curve (straight line) of the theoretical value A in FIG. 7. On the other hand, the curve of the theoretical value B in FIG. 7 shows the value defined by the content of cerium ions in the $CeO_2$—$ZrO_2$ solid solution. Accordingly, where cerium ions and zirconium ions are distributed completely randomly, the OSC relative to the content of $ZrO_2$ is estimated to have a peak at an intersection point of curves of the theoretical value A and the theoretical value B, namely, when the content of $ZrO_2$ is about 57 mol %.

The OSC of the $CeO_2$—$ZrO_2$ solid solution in accordance with the present invention has a peak when the content of $ZrO_2$ is about 60 mol %, as is different from the conventional $CeO_2$—$ZrO_2$ solid solution. This peak is very close to the above-described estimated value. Accordingly, it can be understood that cerium ions and zirconium ions are distributed more randomly, as compared to the conventional $CeO_2$—$ZrO_2$ solid solution, and that the difference in randomness corresponds to the difference in OSC.

It is clarified from FIG. 7, that when the content of $ZrO_2$ is 70 mol % or more, the $CeO_2$—$ZrO_2$ solid solution in accordance with the present invention (Embodiment 5) exhibits the OSC which is close to the theoretical value A, as compared to that of the $CeO_2$—$ZrO_2$ solid solution which has a φ' phase (Comparative example 3). The superiority of the $CeO_2$—$ZrO_2$ solid solution in accordance with the present invention to the $CeO_2$—$ZrO_2$ solid solution having a φ' phase can be considered to be caused by the crystallites of the $CeO_2$—$ZrO_2$ solid solution in accordance with the present invention being smaller (or, the specific surface area thereof being greater), as compared to the $CeO_2$—$ZrO_2$ solid solution which has a φ' phase, whereby the distortion of the crystallites due to the releasing of oxygen is readily reduced.

On the other hand, the difference in OSC between the $CeO_2$—$ZrO_2$ solid solution in accordance with the present invention and the $CeO_2$—$ZrO_2$ solid solution having a φ' phase decreases when the content of $ZrO_2$ is 30 mol % or less. This is considered to be caused by the effect of improving the OSC with $ZrO_2$ being small and the releasing of oxygen from a bulk is decreased in this range, but the releasing of oxygen from the parts in the vicinity of surfaces of the crystallites, where the distortion of lattice is readily reduced, is maintained at some degree, thereby decreasing the influence of the difference in dispersion of $ZrO_2$. When the content of $ZrO_2$ is 30 mol % or less, the OSC of the $CeO_2$—$ZrO_2$ solid solution having a φ' phase is smaller than that of the $CeO_2$—$ZrO_2$ solid solution in accordance with the present invention. This result can be considered to be caused by the specific surface area being small so as to decrease the releasing of oxygen in the vicinity of surfaces of the crystallites.

And the catalyst in accordance with the present invention is characterized in that at least a noble metal is supported by a metal oxide powder in accordance with the present invention. The noble metal is composed of at least one of Pt, Rh, Pd, Ir or the like. The noble metal can be supported by the adsorption method, the impregnation method or the like, similarly to the conventional cases. The catalyst in accordance with the present invention can be used as an oxidation catalyst, hydrogen forming catalyst, three way catalyst or the like. In addition, at least one kind of $NO_x$ sorption material which is selected from the group consisting of alkaline metals, alkali earth metals, and rare earth metals is supported together with the noble metal, whereby a $NO_x$ sorption and reduction catalyst can be provided. It is preferable that the supporting amount of the noble metal per liter of catalyst volume ranges from 0.1 g to 20 g, and that the supporting amount of the $NO_x$ sorption material ranges from 0.05 mol to 2 mol.

Where the catalyst for purifying exhaust gases is produced from the metal oxide powder in accordance with the present invention, the catalyst components such as the noble metal or the $NO_x$ sorption material may be supported by the metal oxide powder after a coat layer is formed thereon, or the coat layer can be formed of a catalyst powder which is obtained by previously supporting the catalyst components on the metal oxide powder.

Operational Advantages of the Invention

With the metal oxide in accordance with the present invention, both the pore volume and the mean diameter of secondary particles thereof are larger than those of the conventional metal oxide, and accordingly, the gas-diffusion properties are excellent. With the catalyst in accordance with the present invention, catalyst components supported on a lower part of a coat layer contact exhaust gases sufficiently to improve the ability of purifying the exhaust gases.

And with the producing method in accordance with the present invention, the metal oxide in accordance with the present invention can be surely and readily produced.

Embodiments

Hereinafter, the present invention will be explained specifically based on several embodiments and comparative examples.

(Embodiment 1)
First Step:
442.29 g of an aqueous solution of cerium nitrate (28 weight % of $CeO_2$), 601.3 g of an aqueous solution of zirconium oxynitrate (18 weight % of $ZrO_2$), and 199.5 g of 30% hydrogen peroxide solution were mixed with 1200 g of an ion-exchange water in a beaker of 3 liter, and 319.9 g of an aqueous solution of 25% ammonia was added to an obtained mixture while stirring with a propeller stirrer, whereby a precipitate of an oxide precursor was obtained.

Second Step:
The obtained precipitate was subjected to a centrifugal separator, and a top clear liquid was removed from the precipitate. The ion-exchange water was added to the obtained precipitate in equal amounts of the removed top clear liquid, and a resultant mixture was stirred, and subjected to the centrifugal separator again. These operations were further conducted twice, thereby washing the obtained precipitate.

Third Step:
After removing a top clear liquid, the precipitate was put in a beaker of 3 liter again, and 1800 g of an ion-exchange water was added to the precipitate, and an obtained mixture was stirred using a propeller stirrer and a homogenizer. 5 g of a cationic surfactant ([ARMAC] produced by LION CORPORATION) and 5 g of an anionic surfactant ([ARMOFLO] produced by LION CORPORATION) were added to the stirred mixture, and further stirred for five minutes.

An obtained dispersion liquid was subjected to a centrifugal separator, and a resultant precipitate was washed, similarly to the second step.

Fourth Step:
After removing a top clear liquid, the precipitate was calcined in the air at 400° C. for five hours using a degreasing furnace, and further calcined in the air at 700° C. for five hours, thereby preparing a powder of a $CeO_2$—$ZrO_2$ solid solution.

The volume of pores of the obtained $CeO_2$—$ZrO_2$ solid solution powder, each having a diameter of 0.1 μm or less, was 0.3 cc/g, and the mean diameter of secondary particles thereof was 6 μm. The volume of pores was measured with a mercury porosimeter, and the mean diameter of the secondary particles were measured with a laser scattering particle size distribution measuring device.

Forming a Catalyst:
The obtained powder of $CeO_2$—$ZrO_2$ solid solution was impregnated with a predetermined amount of an aqueous solution of a Pt—P salt, which has a predetermined concentration, and was calcined in the air at 300° C. for three hours after evaporated and dried, whereby Pt was supported. The supporting amount of Pt is 1 weight %. The powder of $CeO_2$—$ZrO_2$ solid solution, which supports Pt, aluminum nitrate and alumina sol as binders, and an ion-exchange water were mixed together to prepare a slurry, a 35 cc honeycomb substrate (3 mills, 300 cells) made of cordierite was wash-coated with the prepared slurry, and calcined at 500° C. for one hour, thereby forming a coat layer. The coating amount is 150 g per liter of the honeycomb substrate, and the supporting amount of Pt is 1.5 g per liter of the honeycomb substrate.

COMPARATIVE EXAMPLE 1

442.29 g of an aqueous solution of cerium nitrate (28 weight % of $CeO_2$), 601.3 g of an aqueous solution of zirconium oxynitrate (18 weight % of $ZrO_2$), 199.5 g of a 30% a hydrogen peroxide solution, and 12 g of a surfactant ([LEOCON] produced by LION CORPORATION) were mixed with 1200 g of an ion-exchange water in a beaker of 3 liter, and 319.9 g of an aqueous solution of 25% ammonia was added to an obtained mixture while stirring with a propeller stirrer, whereby a precipitate of an oxide precursor was obtained.

The obtained precipitate was calcined in the air at 400° C. for five hours using a degreasing furnace without being washed, and further calcined in the air at 700° C. for five hours, thereby preparing a powder of $CeO_2$—$ZrO_2$ solid solution.

The volume of pores of the obtained $CeO_2$—$ZrO_2$ solid solution powder, each having a diameter of 0.1 μm or less, was 0.05 cc/g, and the mean diameter of secondary particles thereof was 8 μm. The volume of pores was measured with a mercury porosimeter, and the mean diameter of the secondary particles were measured with a laser scattering particle size distribution measuring device.

A catalyst of Comparative example 1 was prepared, similarly to Embodiment 1 except that the thus prepared powder of $CeO_2$—$ZrO_2$ solid solution was used.

(Embodiment 2)

First Step:

278 g of an aqueous solution of zirconium oxynitrate (18 weight % of $ZrO_2$) was mixed with 1800 g of an ion-exchange water in a beaker of 3 liter, and 67 g of an aqueous solution of 25% ammonia was added to an obtained mixture while stirring with a propeller stirrer, whereby a precipitate of a precursor of oxide was obtained.

Second Step:

The obtained precipitate was subjected to a centrifugal separator, and a top clear liquid was removed from the precipitate. The ion-exchange water was added to the obtained precipitate in equal amounts of the removed top clear liquid, and a resultant mixture was stirred, and subjected to the centrifugal separator again. These operations were further conducted twice, thereby washing the obtained precipitate.

Third Step:

After removing a top clear liquid, the precipitate was put in a beaker of 3 liter again, and 1800 g of an ion-exchange water was added to the precipitate, and a obtained mixture was stirred using a propeller stirrer and a homogenizer. 5 g of an anionic surfactant ([ARMOFLO] produced by LION CORPORATION) was added to the stirred mixture, and further stirred for five minutes.

An obtained dispersion liquid was subjected to a centrifugal separator, and a resultant precipitate was washed, similarly to the second step.

Fourth Step:

After removing a top clear liquid, the precipitate was calcined in the air at 400° C. for five hours using a degreasing furnace, and further calcined in the air at 800° C. for five hours, thereby preparing a $ZrO_2$ powder.

The pore size distribution of the obtained $ZrO_2$ powder was measured with a mercury porosimeter, and the measurement results were shown in FIG. 1. The mean diameter of the secondary particles, which was measured, similarly to Embodiment 1, was 7 μm.

Forming a Catalyst:

The obtained $ZrO_2$ powder was impregnated with a predetermined amount of an aqueous solution of rhodium nitrate, which had a predetermined concentration, and was calcined in the air at 300° C. for three hours after evaporated and dried, whereby Rh is supported by the $ZrO_2$ powder. The supporting amount of Rh is 1 weight %. The $ZrO_2$ powder supporting Rh, aluminum nitrate and alumina sol as binders, and an ion-exchange water were mixed together to prepare a slurry, a honeycomb substrate (3 mills, 400 cells) made of cordierite and having a volume of 35 cc was wash-coated with the prepared slurry, and calcined at 500° C. for one hour, thereby forming a coat layer. The coating amount is 40 g per liter of the honeycomb substrate, and the supporting amount of Rh is 0.4 g per liter of the honeycomb substrate.

COMPARATIVE EXAMPLE 2

278 g of an aqueous solution of zirconium oxynitrate (18 weight % of $ZrO_2$) was mixed with 1800 g of an ion-exchange water in a beaker of 3 liter, and 67 g of an aqueous solution of 25% ammonia was added to an obtained mixture while stirring with a propeller stirrer, whereby a precipitate of an oxide precursor of oxide was obtained.

The obtained precipitate was calcined in the air at 400° C. for five hours using a degreasing furnace without being washed, and further calcined in the air at 800° C. for five hours, thereby preparing a $ZrO_2$ powder.

The pore size distribution of the obtained $ZrO_2$ powder was measured with a mercury porosimeter, and the measurement result is shown in FIG. 1. "V" in the ordinate in FIG. 1 represents the diameter of pores. The mean diameter of the secondary particles of the $ZrO_2$ powder, which was measured, similarly to Embodiment 1, was 8 μm.

A catalyst of Comparative example 2 was prepared, similarly to Embodiment 2 except that the thus prepared $ZrO_2$ powder was used.

<Test·Evaluation>

Catalysts of Embodiment 1 and Comparative example 1 were disposed in an evaluation device, respectively, and a rich-lean endurance test was carried out. These catalysts were subjected to a flow of a rich gas of a model gas shown in Table 1 for 1 minute, and then subjected to a flow of a lean gas thereof for 4 minutes. These operations are repeated at 900° C. for 5 hours. The total flowing amount is 20 L/min. In addition, the above-described catalysts were subjected to an air endurance test. They were held in the air at 900° C. for 5 hours.

TABLE 1

| | CO (%) | $H_2$ (%) | $CO_2$ (%) | NO (%) | $CH_4$ (%) | $H_2O$ (%) | $O_2$ (%) | $N_2$ (%) |
|---|---|---|---|---|---|---|---|---|
| rich | 1.125 | 0.375 | 3 | 0.025 | 0.007 | 3 | — | Balance |
| lean | 1.125 | 0.375 | 3 | 0.025 | 0.007 | 3 | 4 | Balance |

Figure 2:
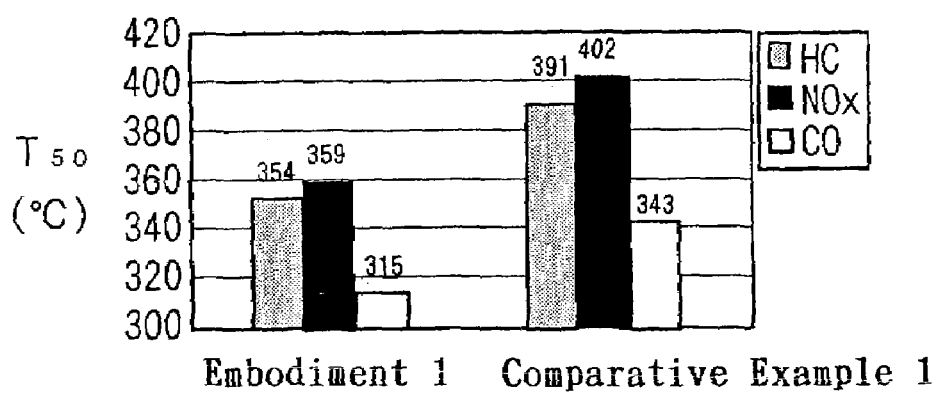
FIG. 2 is a graph showing the temperatures when catalysts of Embodiment 1 and Comparative example 1 are respectively purified with a purification rate of 50% after a rich-lean endurance test.
Figure 3:
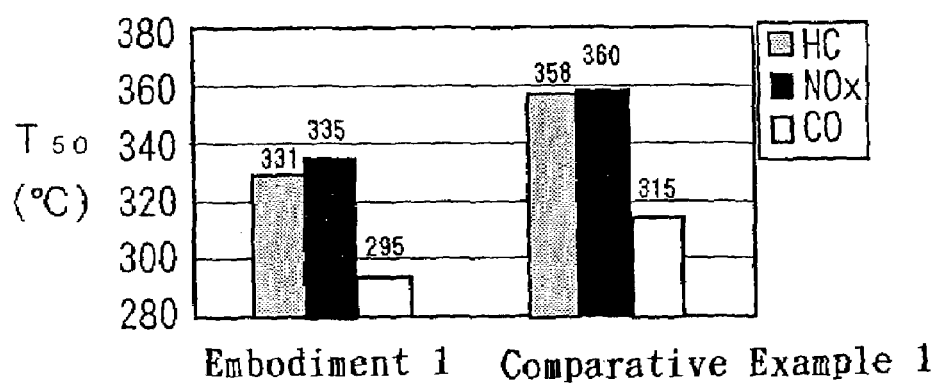
FIG. 3 is a graph showing the temperatures when catalysts of Embodiment 1 and Comparative example 1 are respectively purified with a purification rate of 50% after an air endurance test.

Catalysts after the above-described endurance tests were respectively subjected to a flow a rich gas of a model gas shown in Table 2 for 1 second, and then subjected to a flow of a lean gas thereof for 1 second. These operations are repeated with the total flowing amount of 20 L/min while continuously raising the temperature at the rate of 20° C./min. The purification rate of HC, CO and $NO_x$ was continuously measured. Then, the temperature ($T_{50}$) when 50% of these harmful components were purified was calculated, and calculation results are shown in FIG. 2 and FIG. 3. Numbers shown at peaks of bar graphs in FIG. 2 and FIG. 3 indicate actual values of $T_{50}$.

TABLE 2

| | CO (%) | $H_2$ (%) | $CO_2$ (%) | $O_2$ (%) | NO (%) | $C_8H_{18}$ (%C) | $H_2O$ (%) | $N_2$ (%) |
|---|---|---|---|---|---|---|---|---|
| rich | 0.75 | 0.25 | 5 | 0.5 | 0.04 | 0.32 | 3 | Balance |
| lean | 0.375 | 0.125 | 5 | 1 | 0.04 | 0.32 | 3 | Balance |

Catalysts of Embodiment 2 and Comparative example 2 were disposed in an evaluation device, respectively, and a rich-lean endurance test was carried out. These catalysts were subjected to a flow of a rich gas of a model gas shown in Table 1 for 1 minute, and then subjected to a flow of a lean gas thereof for 4 minutes. These operations are repeated at 1000° C. for 5 hours. The total flowing amount is 20 L/min. In addition, the above-described catalysts were subjected to an air endurance test. They were held in the air at 850° C. for 5 hours.

Figure 4:
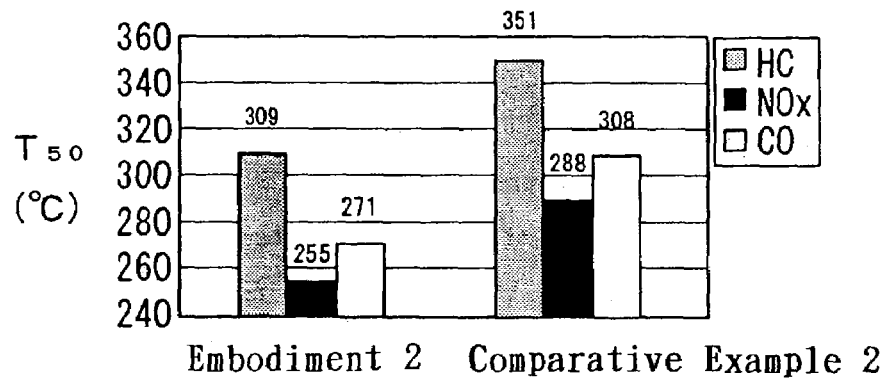
FIG. 4 is a graph showing the temperatures when catalysts of Embodiment 2 and Comparative example 2 are respectively purified with a purification rate of 50% after a rich-lean endurance test.
Figure 5:
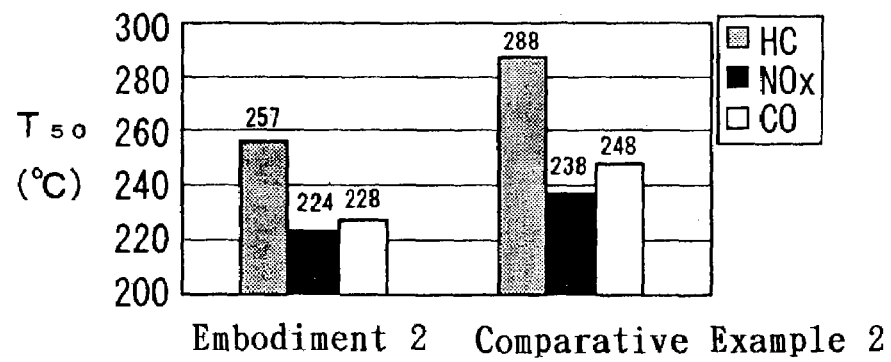
FIG. 5 is a graph showing the temperatures when catalysts of Embodiment 2 and Comparative example 2 are respectively purified with a purification rate of 50% after an air endurance test.

Catalysts after the above-described endurance tests were respectively subjected to a flow of a rich gas of a model gas shown in Table 2 for 1 second, and then subjected to a flow of a lean gas thereof for 1 second. These operations are repeated with the total flowing amount of 20 L/min while continuously raising the temperature at the rate of 20 C/min. The purification rate of HC, CO and $NO_x$ was continuously measured. Then, the temperature ($T_{50}$) when 50% of these harmful components were purified was calculated, and calculation results are shown in FIG. 4 and FIG. 5. Numbers shown at peaks of bar graphs in FIG. 4 and FIG. 5 indicate actual values of $T_{50}$.

FIG. 2 and FIG. 3 show that the catalyst of Embodiment 1 exhibits a high purifying ability after the above-described endurance tests even in a low temperature region, as compared to the catalyst of Comparative example 1, and this result can be considered to be caused by the difference in both of pore volume of the $CeO_2$—$ZrO_2$ powder, and mean diameter of the secondary particles. Namely, it can be considered that since the catalyst of Embodiment 1 exhibits an excellent gas-diffusion properties in the coat layer, Pt supported by the lower part of the coat layer was also used effectively.

In addition, FIG. 4 and FIG. 5 show that the catalyst of Embodiment 2 exhibits a high purifying ability after the above-described endurance tests even in a low temperature region, as compared to the catalyst of Comparative example 2, and this result can be considered to be caused by the pore volume of the catalyst of Embodiment 2 being larger, as shown in FIG. 1, and the mean diameter of the secondary particles being larger, as compared to the catalyst of Comparative example 2. Namely, it can be considered that since the catalyst of Embodiment 2 exhibits excellent gas-diffusion properties in the coat layer, Rh supported by the lower part of the coat layer was also used effectively.

(Embodiment 3)

First Step:

589.71 g of an aqueous solution of cerium nitrate (28 weight % of $CeO_2$), 437.3 g of an aqueous solution of zirconium oxynitrate (18 weight % of $ZrO_2$), 199.5 g of a 30% hydrogen peroxide solution, and 12 g of a surfactant ([LEOCON] produced by LION CORPORATION) were mixed with 1200 g of an ion-exchange water in a beaker of 3 liter, and 340 g of an aqueous solution of 25% ammonia was added to an obtained mixture while stirring with a propeller stirrer and a homogenizer, whereby a precipitate of an oxide precursor was obtained.

A $CeO_2$—$ZrO_2$ solid solution powder of the present embodiment was prepared in the second to fourth steps, similarly to Embodiment 1.

The volume of pores of the obtained $CeO_2$—$ZrO_2$ solid solution powder, each having a diameter of 0.1 µm or less, was 0.3 cc/g, and the mean diameter of secondary particles thereof was 6 µm. The volume of pores was measured with a mercury porosimeter, and the mean diameter of the secondary particles were measured with a laser scattering particle size distribution measuring device.

(Embodiment 4)

First Step:

589.71 g of an aqueous solution of cerium nitrate (28 weight % of $CeO_2$), 437.3 g of an aqueous solution of zirconium oxynitrate (18 weight % of $ZrO_2$), and 199.5 g of a 30% hydrogen peroxide solution were mixed with 1200 g of an ion-exchange water in a beaker of 3 liter, and 3 g of an aqueous solution of 25% ammonia was added to an obtained mixture and stirred with a propeller stirrer. A resultant mixture was pressurized and matured at 120° C. for 2 hours. Then, 340 g of an aqueous solution of 25% ammonia was added to the obtained solution while stirring with a propeller stirrer, thereby obtaining a precipitate of an oxide precursor.

A $CeO_2$—$ZrO_2$ solid-solution powder of the present embodiment was prepared in the second to fourth steps, similarly to Embodiment 1.

The volume of pores of the obtained $CeO_2$—$ZrO_2$ solid solution powder, each having a diameter of 0.1 µm or less, was 0.2 cc/g, and the mean diameter of secondary particles thereof was 6 µm. The volume of pores was measured with a mercury porosimeter, and the mean diameter of the secondary particles were measured with a laser scattering particle size distribution measuring device.

<Tests•Evaluation>

The pore size distribution of the obtained $CeO_2$—$ZrO_2$ solid solution powders of Embodiment 3 and Embodiment 4 were measured with a mercury porosimeter. The measurement results are shown in FIG. 6.

Figure 6:
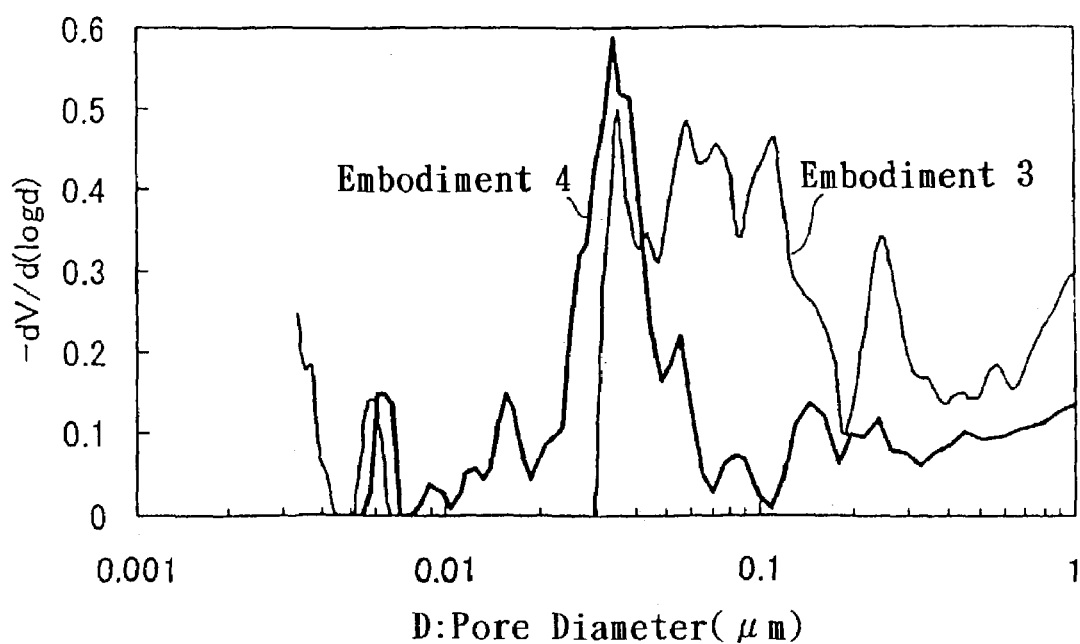
FIG. 6 is a graph showing the pore size distribution of powders of $CeO_2$—$ZrO_2$ solid solutions of Embodiment 3 and Comparative example 4.

FIG. 6 shows that the pore size distribution of the $CeO_2$—$ZrO_2$ solid solution powder of Embodiment 4 concentrates in a fine region, as compared to Embodiment 3. This is considered to be caused by the precipitation being carried out under the coexistence of hydrogen peroxide.

FIG. 6 also shows that in the $CeO_2$—$ZrO_2$ solid solution powder of Embodiment 4, the volume of the pores, each having a pore diameter of 0.01 µm or more and 0.05 µm or less, is 0.1 cc/g or more, which is 70% or more of the volume of pores, each having a pore diameter of 0.01 µm or more and 0.1 µm or less.

(Embodiment 5)

An aqueous solution of cerium nitrate, which includes 28 weight % of $CeO_2$, and an aqueous solution of zirconyl nitrate, which contains 20 weight % of $ZrO_2$, were mixed in a glass beaker such that $CeO_2$ and $ZrO_2$ were included in the compositions shown in Table 3, and 100 g of ethylene glycol was further added to a resultant mixture while stirring with a magnetic stirrer, whereby a mixture solution was prepared.

TABLE 3

| $CeO_2$ (mol) | $ZrO_2$ (mol) |
|---|---|
| 0.161 | 0.018 |
| 0.148 | 0.037 |
| 0.133 | 0.057 |
| 0.118 | 0.079 |
| 0.102 | 0.102 |
| 0.084 | 0.126 |
| 0.065 | 0.152 |
| 0.045 | 0.180 |
| 0.023 | 0.211 |

Next, a heater was switched on, and the heater temperature was kept at about 200° C. while stirring. First, moisture started to evaporate from a mixture solution, a salt decomposed to emit a decomposition gas while the volume of the mixture solution decreased. The mixture solution became white in the course of the heating step, and changed to a gel. Heating step was stopped when the volume of the mixture solution decreased to about ½, 3 g of a surfactant ([LEOCON] produced by LION CORPORATION) was added, and a resultant mixture was stirred with a propeller stirrer and a homogenizer for five minutes.

Next, the glass beaker was transferred to a degreasing furnace, heated from a room temperature to 500° C. at a raising rate of 50° C./hr, and held at 500° C. for five hours, whereby a $CeO_2$—$ZrO_2$ solid solution powder from which organic substances were eliminated was obtained.

The volume of the pores of the obtained $CeO_2$—$ZrO_2$ solid solution powder, each having a pore diameter of 0.1 μm or less, was 0.3 cc/g or more, and the mean diameter of secondary particles was 6 μm. The volume of pores was measured with a mercury porosimeter, and the mean diameter of the secondary particles were measured with a laser scattering porosity particle size distribution measuring device.

COMPARATIVE EXAMPLE 3

An aqueous solution of cerium nitrate, which includes 20 weight % of $CeO_2$, and an aqueous solution of zirconyl nitrate, which includes 20 weight % of $ZrO_2$, were mixed together such that $CeO_2$ and $ZrO_2$ were included in the compositions shown in Table 4, and a 30% hydrogen peroxide solution was further added to a resultant mixture such that 0.2 mol of $H_2O_2$ is included, whereby seven kinds of mixture solutions were prepared.

TABLE 4

| $CeO_2$ (mol) | $ZrO_2$ (mol) |
|---|---|
| 0.133 | 0.057 |
| 0.118 | 0.079 |
| 0.102 | 0.102 |
| 0.084 | 0.126 |
| 0.065 | 0.152 |
| 0.045 | 0.180 |
| 0.023 | 0.211 |

A 25% ammonia water was added to respective resultant mixture solutions while stirring with a homogenizer such that the mol of $NH_3$ was 1.2 times of the total mol of $CeO_2$ and $ZrO_2$, and a resultant mixture solutions were respectively stirred for 10 minutes. Then, the solutions were heated with a heating rate of 100° C./hour, and held at 500° C. for five hours, whereby $CeO_2$ and $ZrO_2$ solid solutions were obtained from the mixture solid solutions. The obtained $CeO_2$ and $ZrO_2$ solid solutions respectively have a fluorite structure.

COMPARATIVE EXAMPLE 4

50 g of a $CeO_2$ powder on the market was pulverized by means of a medium stirring mill (DYNO-MILL) which uses $ZrO_2$ as a pulverizing medium, using ethanol as a dispersion medium. $ZrO_2$ was supplied from the pulverizing medium while pulverization was carried out at a rotating speed of 4200 rpm. Thus, an oxide in which $ZrO_2$ was dissolved in $CeO_2$ in a solid phase was formed by a mechanical alloying method. The obtained oxide is a $CeO_2$ and $ZrO_2$ solid solution having a fluorite structure. The content of $ZrO_2$ increases with the pulverizing time so that by changing the pulverizing time variously, oxides having various contents of $ZrO_2$, which were shown in Table 5, was respectively obtained. The content of $ZrO_2$ was obtained from the composition analysis using ICP (inductively coupled plasma emission spectrochemical analyzing device).

TABLE 5

| Pulverizing Time (hr) | $ZrO_2$ (mol %) |
|---|---|
| 4 | 9.0 |
| 8 | 17.0 |
| 13 | 24.0 |
| 18 | 32.0 |
| 23 | 40.4 |
| 29 | 50.0 |
| 35 | 58.6 |
| 45 | 68.9 |

<Tests•Evaluation>

The OSC of each of the $CeO_2$—$ZrO_2$ solid solutions of Embodiment 5 and Comparative examples 3 and 4 was measured. The measurement results are shown in FIG. 7. The measurement of the OSC was carried out by making the $CeO_2$—$ZrO_2$ solid solutions support 1 weight % of Pt, respectively, with the impregnating method, measuring a reversible weight variation at 500° C. in the atmosphere in which an $N_2$ gas which contains 20 volume % of $H_2$, and an $N_2$ gas which contains 50 volume % of $O_2$ are made to alternately flow, using a thermogravimetric analyzer, and converting the obtained weight variation to a absorption and releasing amount of oxygen. In FIG. 7, an upper limit of the OSC, which is defined by the content of the cerium ions, is shown as a theoretical value A, and it corresponds to the case where the entire cerium ions reversibly changes between trivalence and quatrevalence. In addtion, the OSC corresponding to the number of oxygen of which coordinated four cations become all zirconium ions where the distribution of the cerium ions and the zirconium ions is completely random, is shown as a theoretical value B. Nagai et al. have estimated in "Catalysis Today 74 (2002) 225–234" that when oxygen is released from a bulk, oxygen of which coordinated four cations are all zirconium ions is released. In the vicinity of surfaces of the bulk, oxygen of which coordinated cations are cerium ions, is also released.

As is apparent from FIG. 7, the $CeO_2$—$ZrO_2$ solid solution of Embodiment 5 has a peak OSC in the region in which the atomic ratio of Ce/Zr ranges from 50/50 to 30/70. This result shows that the $CeO_2$—$ZrO_2$ solid solution of Embodiment 5 has the arrangement of cerium ions and zirconium ions, which is similar to an ideal random dispersion state where oxygen within crystals of the solid solution is readily desorbable, as compared to the $CeO_2$—$ZrO_2$ solid solutions of Comparative example 3 and Comparable example 4. In addition, FIG. 7 shows that the $CeO_2$—$ZrO_2$ solid solution of Embodiment 5 exhibits a high OSC, as compared to the $CeO_2$—$ZrO_2$ solid solutions of Comparative example 3 and Comparative example 4, and that when the content of $ZrO_2$ is between 50 and 70 mol %, the saturated oxygen storage amount at 500° C. is 500 μmol-$O_2$/g or more.

In addition, FIG. 8 shows the OSC in cerium ions of the $CeO_2$—$ZrO_2$ solid solution. In the case of the $CeO_2$—$ZrO_2$ solid solution of Embodiment 5, when the content of $ZrO_2$ is 50 mol % or more, the ratio of the cerium ions which contribute to the achievement of the oxygen storage ability out of the entire cerium ions contained is 60% or more, and when the content of $ZrO_2$ is 60 mol % or more, the ratio of the cerium ions which contribute to the achievement of the oxygen storage ability is 80% or more. The using rate of cerium ions of the CeO$_2$—ZrO$_2$ solid solution of Embodiment 5 is higher than that of the CeO$_2$—ZrO$_2$ solid solutions of Comparative examples 3 and 4. This result also shows that the CeO$_2$—ZrO$_2$ solid solution of Embodiment 5 exhibits a high OSC.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A metal oxide comprising secondary particles having pores, wherein a volume of pores having a diameter of 0.1 μm or less is 0.2 cc/g or more, wherein said metal oxide is a ceria-zirconia solid solution, and wherein said metal oxide has a specific surface area of 80 m$^2$/g or more after calcining at 600° C. for five hours, a specific surface area of 40 m$^2$/g or more after calcining at 800° C. for five hours, and a specific surface area of 20 m$^2$/g or more after calcining at 1000° C. for five hours.

2. A metal oxide as claimed in claim 1, wherein the volume of said pores is 0.3 cc/g or more.

3. A metal oxide as claimed in claim 1, wherein the volume of pores having a diameter of 0.01 μm or more and 0.1 μm or less is 0.2 cc/g or more.

4. A metal oxide as claimed in claim 1, wherein the volume of pores having a diameter of 0.01 μm or more and 0.05 μm or less is 0.1 cc/g or more.

5. A metal oxide as claimed in claim 4, wherein said volume is 70% or more of a volume of pores having a diameter of 0.01 μm or more and 0.1 μm or less.

6. A metal oxide as claimed in claim 1, wherein said metal oxide has a cubic system fluorite structure, and does not have a specific regular cationic arrangement, and 75% or more of Ce ions become trivalent in a reduction atmosphere at 500° C.

7. A metal oxide as claimed in claim 6, wherein 90% or more of Ce ions become trivalent in a reduction atmosphere at 500° C.

8. A metal oxide as claimed in claim 6, wherein the specific regular cationic arrangement that said metal oxide does not have is a pyrochlore phase.

9. A metal oxide as claimed in claim 1, wherein zirconia is dissolved homogeneously with solid-solubility of 98% or more.

10. A metal oxide as claimed in claim 1, wherein said metal oxide exhibits a peak oxygen storage amount when the atomic ratio of Ce/Zr ranges from 45/55 to 40/60.

11. A metal oxide as claimed in claim 1, wherein 60% or more of cerium ions included in said metal oxide contribute to the achievement of an oxygen storage capacity.

12. A metal oxide as claimed in claim 11, wherein 75% or more of cerium ions included in said metal oxide contribute to the achievement of the oxygen storage capacity.

13. A metal oxide as claimed in claim 12, wherein 90% or more of cerium ions included in said metal oxide contribute to the achievement of the oxygen storage capacity.

14. A metal oxide as claimed in claim 11, wherein said metal oxide exhibits a saturated oxygen storage amount of 450 μmol-O$_2$/g or more at 500° C., and has a fluorite crystal structure.

15. A metal oxide as claimed in claim 14, wherein said metal oxide has a saturated oxygen storage amount of 500 μmol-O$_2$/g or more at 500° C.

16. A metal oxide as claimed in claim 1, wherein said ceria-zirconia solid solution can have substantially a cubic system fluorite structure when the atomic ratio of Ce/Zr is 1/9, without transforming to one of a tetragonal system and a monoclinic system after heat-treating at 500° C.

17. A catalyst comprising a metal oxide as claimed in one of claims 1 to 5, 6–15, 16 or 8, said metal oxide supporting at least one noble metal.

18. A method for producing a metal oxide, comprising:

a first step of adding an alkaline material to an aqueous solution in which a compound of a metal element for forming an oxide is dissolved, thereby obtaining a precipitate of a precursor of said oxide;

a second step of washing said precipitate to remove said alkaline material;

a third step of stirring said washed precipitate within a water together with a surfactant; and a fourth step of calcining a precipitate obtained after said third step, said first, second, third and fourth steps being carried out in order.

19. A method for producing a metal oxide, as claimed in claim 18, wherein said surfactant is added by 2 to 40 weight % of a resultant metal oxide powder.

20. A method for producing a metal oxide, as claimed in claim 18, wherein said metal element is one of zirconium and cerium with zirconium.

21. A method for producing a metal oxide comprising:

a mixing step of forming a solution which comprises a cerium compound and zirconium compound, each compound decomposing by heating, and further comprises an organic substance such that said cerium compound and said zirconium compound are dissolved in said solution at least upon heating, and preparing a mixture in which at least one part of said organic substance is liquid after at least one part of said cerium compound and said zirconium compound decompose;

a decomposing step of adding a surfactant to said mixture and heating an obtained mixture after stirring for 5 minutes or more, whereby said obtained mixture decomposes and a homogeneous precursor is formed; and a calcining step of calcining said precursor such that said organic substance is burnt off, thereby forming a ceria-zirconia solid solution.

* * * * *

UNITED STATES PATENT AND TRADEMARK OFFICE
CERTIFICATE OF CORRECTION

PATENT NO. : 7,214,643 B2  Page 1 of 1
APPLICATION NO. : 10/393068
DATED : May 8, 2007
INVENTOR(S) : Toshio Yamamoto et al.

It is certified that error appears in the above-identified patent and that said Letters Patent is hereby corrected as shown below:

Column 8, lines 36-37, " polyxyethylene alkyl phenyl ether, "
    should read -- polyoxyethylene alkyl phenyl ether, --.

Column 9, line 47, " at lease one part of " should read -- at least one part of --.

Column 22, line 15, " of claims 1 to 5, 6-15, 16 or 8, said metal oxide "
    should read -- of claims 1-5 or 6-16, said metal oxide --.

Signed and Sealed this

Fourth Day of December, 2007

JON W. DUDAS
*Director of the United States Patent and Trademark Office*